United States Patent
Marell

(10) Patent No.: US 12,172,222 B2
(45) Date of Patent: Dec. 24, 2024

(54) TURNING TOOL FOR METAL CUTTING

(71) Applicant: AB SANDVIK COROMANT, Sandviken (SE)

(72) Inventor: Fredrik Marell, Gavle (SE)

(73) Assignee: AB Sandvik Coromant, Sandviken (SE)

( * ) Notice: Subject to any disclaimer, the term of this patent is extended or adjusted under 35 U.S.C. 154(b) by 505 days.

(21) Appl. No.: 17/611,514

(22) PCT Filed: Feb. 3, 2020

(86) PCT No.: PCT/EP2020/052558
§ 371 (c)(1),
(2) Date: Nov. 15, 2021

(87) PCT Pub. No.: WO2020/228997
PCT Pub. Date: Nov. 19, 2020

(65) Prior Publication Data
US 2022/0241869 A1 Aug. 4, 2022

(30) Foreign Application Priority Data
May 16, 2019 (EP) .................................... 19174811

(51) Int. Cl.
*B23B 27/16* (2006.01)
(52) U.S. Cl.
CPC ...... *B23B 27/1614* (2013.01); *B23B 27/1607* (2013.01); *B23B 2200/0461* (2013.01); *B23B 2200/326* (2013.01); *B23B 2205/04* (2013.01)

(58) Field of Classification Search
CPC ........ B23B 2200/0461; B23B 27/1614; B23B 27/1607; B23B 2200/326; B23B 2205/04; B23B 27/141
See application file for complete search history.

(56) References Cited

U.S. PATENT DOCUMENTS 5,236,288 A * 8/1993 Flueckiger ............ B23C 5/2213
407/62
5,525,016 A * 6/1996 Paya ...................... B23B 27/141
407/116

(Continued)

FOREIGN PATENT DOCUMENTS

| WO | 97/11806 A1 | 4/1997 |
| WO | 2004056515 A1 | 7/2004 |
| WO | 2007001224 A1 | 1/2007 |

*Primary Examiner* — Sara Addisu
(74) *Attorney, Agent, or Firm* — Corinne R. Gorski

(57) ABSTRACT

A turning tool includes a tool body, insert seat and a turning insert. The turning insert has a top surface and an opposite bottom surface, a reference plane between the top and bottom surfaces, and a center axis intersecting the top and bottom surfaces. A circular cutting edge of the insert is concentric in relation to the center axis. The bottom surface includes a set of radial grooves and a set of flat surfaces. The flat surfaces extend in a plane parallel to the reference plane. The insert seat includes a bottom surface and a rear surface. The bottom surface of the insert seat has a first ridge and a support surface, wherein at least one of the flat surfaces of the turning insert is in contact with the support surface. A cross-section of the first ridge is smaller than a corresponding cross section of one of the radial grooves.

12 Claims, 13 Drawing Sheets

(56) References Cited

U.S. PATENT DOCUMENTS

| | | | | |
|---|---|---|---|---|
| 5,810,518 | A * | 9/1998 | Wiman | B23B 27/1614 407/102 |
| 5,863,162 | A * | 1/1999 | Karlsson | B23B 51/02 408/233 |
| 5,924,826 | A * | 7/1999 | Bystrom | B23B 29/046 407/103 |
| 5,931,613 | A * | 8/1999 | Larsson | B23B 27/08 407/103 |
| 6,146,060 | A * | 11/2000 | Rydberg | B23C 5/1054 407/103 |
| 6,152,658 | A * | 11/2000 | Satran | B23B 27/00 407/120 |
| 6,168,356 | B1 * | 1/2001 | Sjoo | B23B 27/1614 407/107 |
| 7,121,771 | B2 * | 10/2006 | Englund | B23B 27/1622 407/111 |
| 8,573,903 | B2 * | 11/2013 | Morrison | B23C 5/2213 407/115 |
| 8,657,539 | B2 * | 2/2014 | Morrison | B23C 5/2213 407/62 |
| 8,858,130 | B2 * | 10/2014 | Morrison | B23C 5/06 407/62 |
| 9,120,154 | B2 * | 9/2015 | Hecht | B23B 27/1622 |
| 11,396,051 | B2 * | 7/2022 | Maier | B23B 27/1611 |
| 11,786,982 | B2 * | 10/2023 | Dufour | B23C 5/06 407/113 |
| 2005/0244233 | A1 * | 11/2005 | Jonsson | B23B 27/1618 407/115 |
| 2007/0009334 | A1 * | 1/2007 | Edler | B23B 27/1625 407/107 |
| 2007/0292220 | A1 * | 12/2007 | Sjoberg | B23B 27/1611 407/66 |
| 2008/0145159 | A1 * | 6/2008 | Benson | B23B 27/164 407/114 |
| 2008/0232911 | A1 * | 9/2008 | Hyatt | B23B 1/00 82/131 |
| 2014/0086694 | A1 * | 3/2014 | Fang | B23C 5/205 407/113 |
| 2014/0212226 | A1 * | 7/2014 | Saji | B23C 5/109 407/33 |
| 2014/0294525 | A1 * | 10/2014 | Hecht | B23B 27/1651 407/103 |
| 2016/0207124 | A1 * | 7/2016 | Brown | B23C 5/2213 |
| 2022/0234115 | A1 * | 7/2022 | Lof | B23B 27/1614 |

* cited by examiner

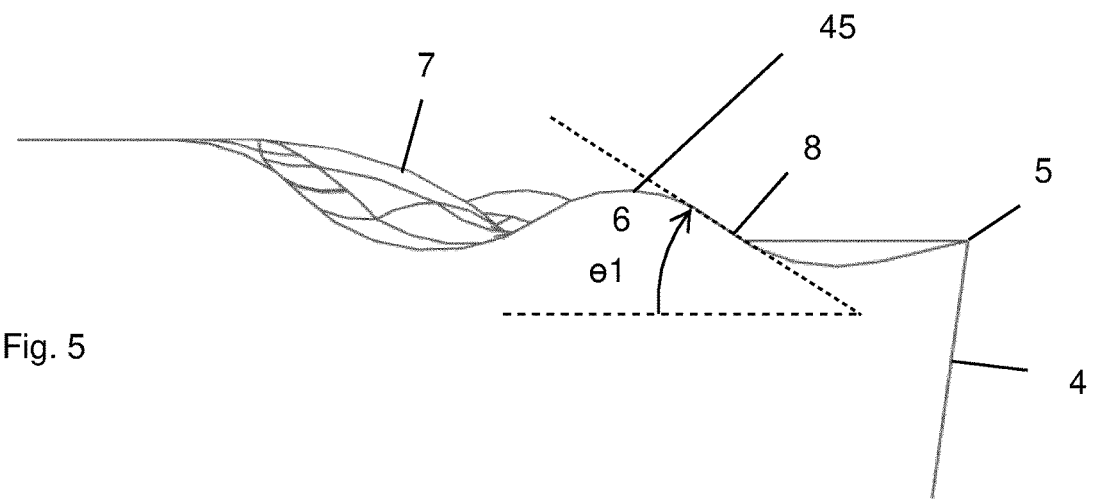
Fig. 5
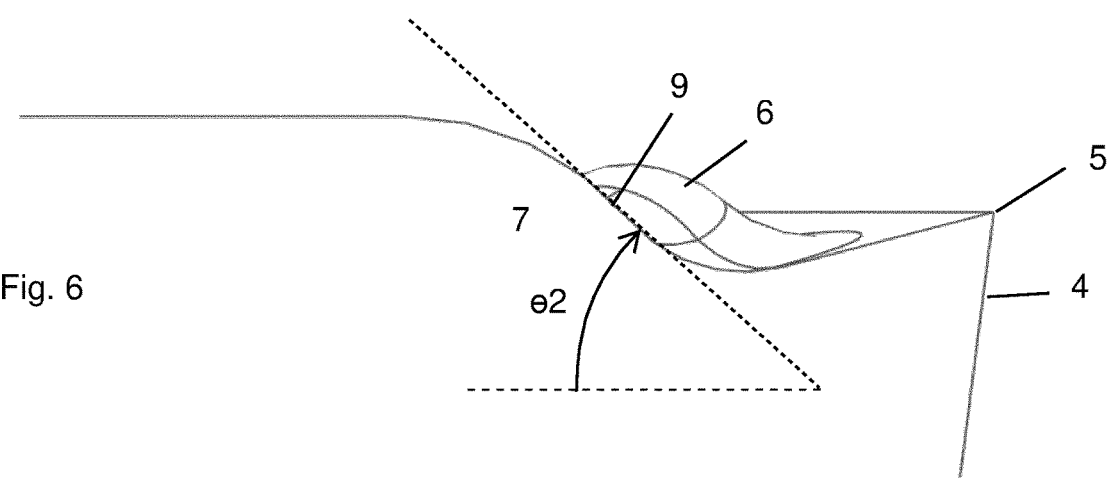
Fig. 6
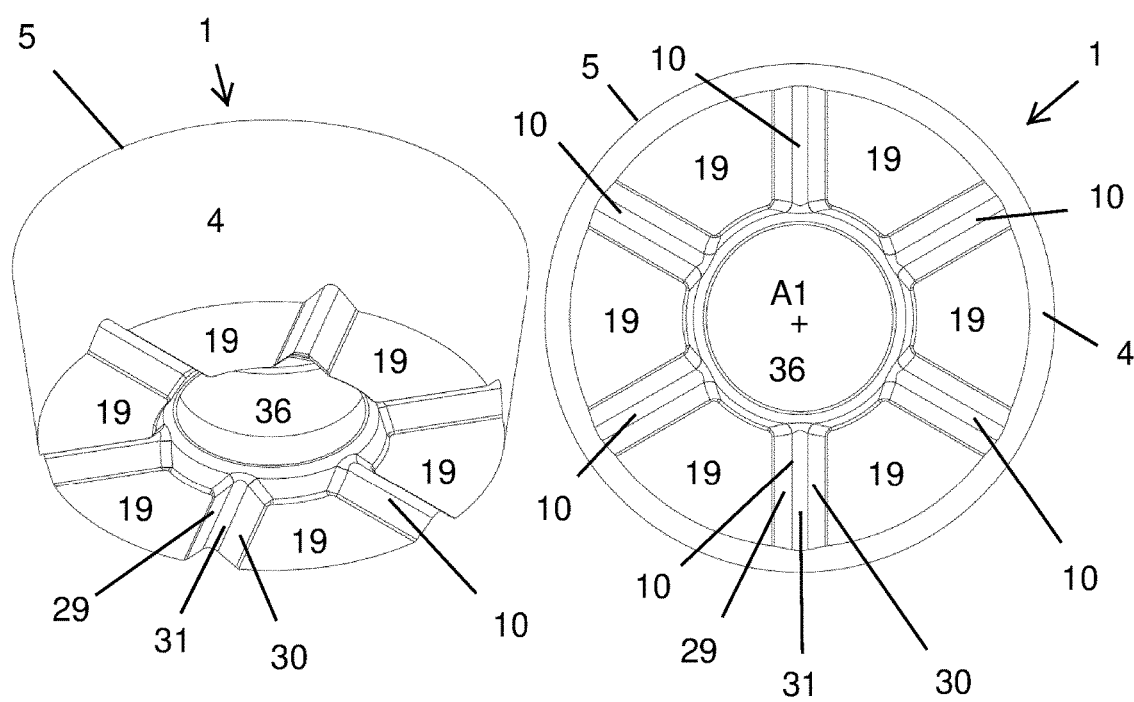
Fig. 7
Fig. 8

Fig. 25
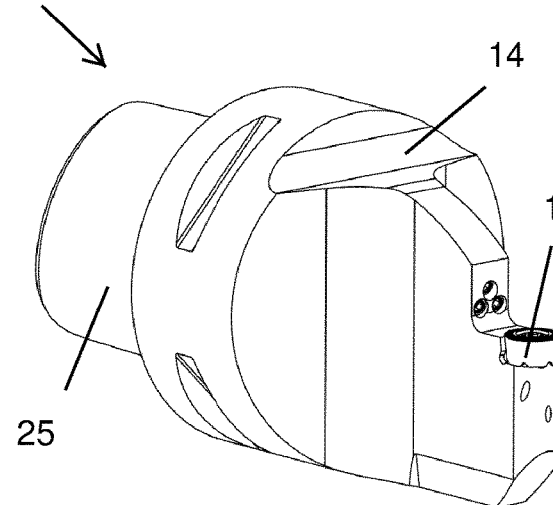
Fig. 26
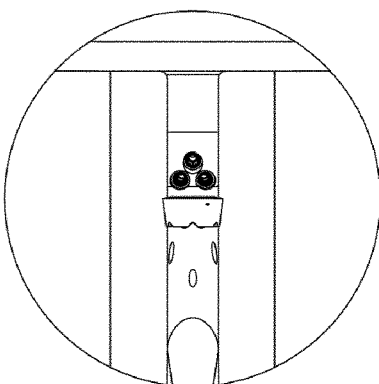
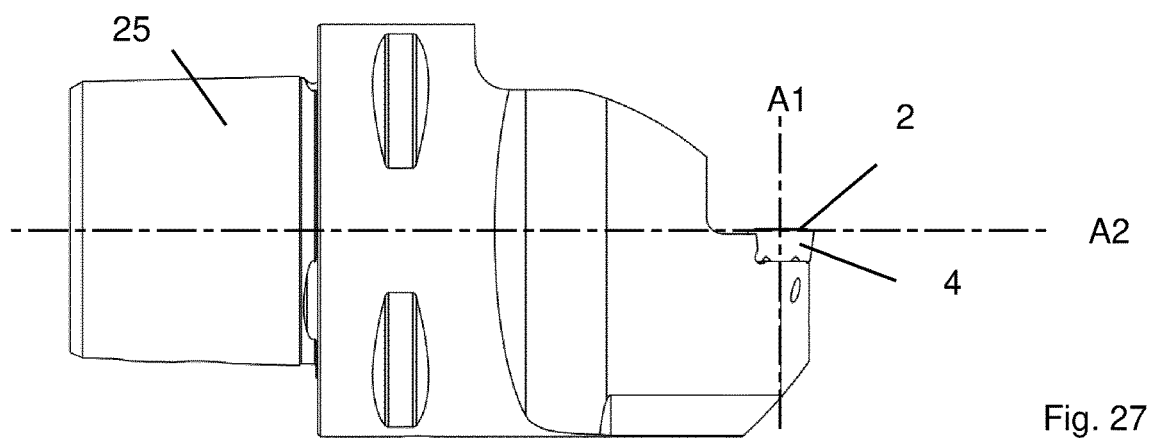
Fig. 27
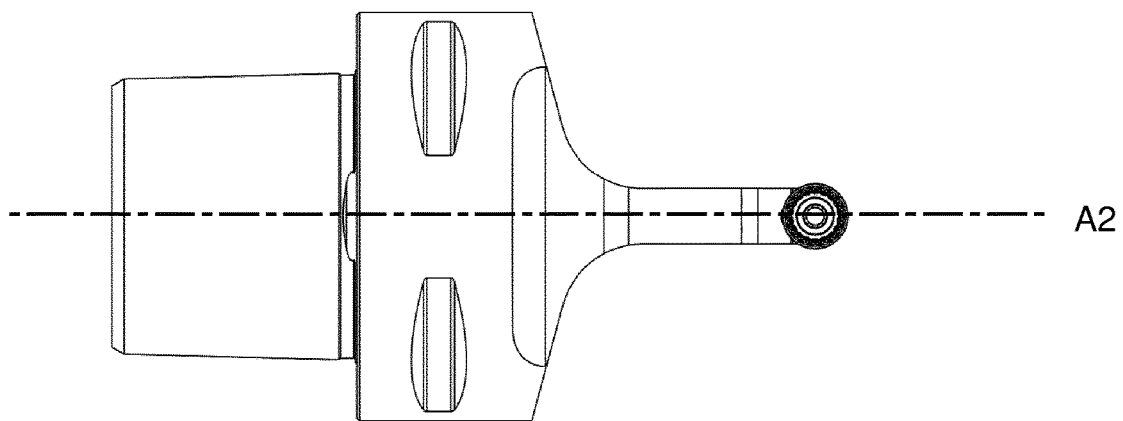
Fig. 28

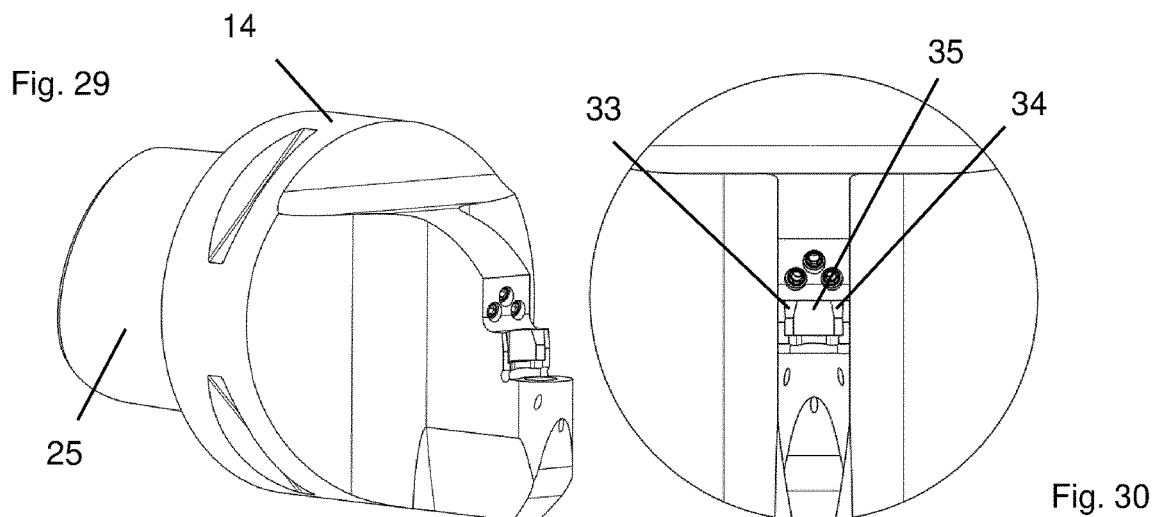
Fig. 29
Fig. 30
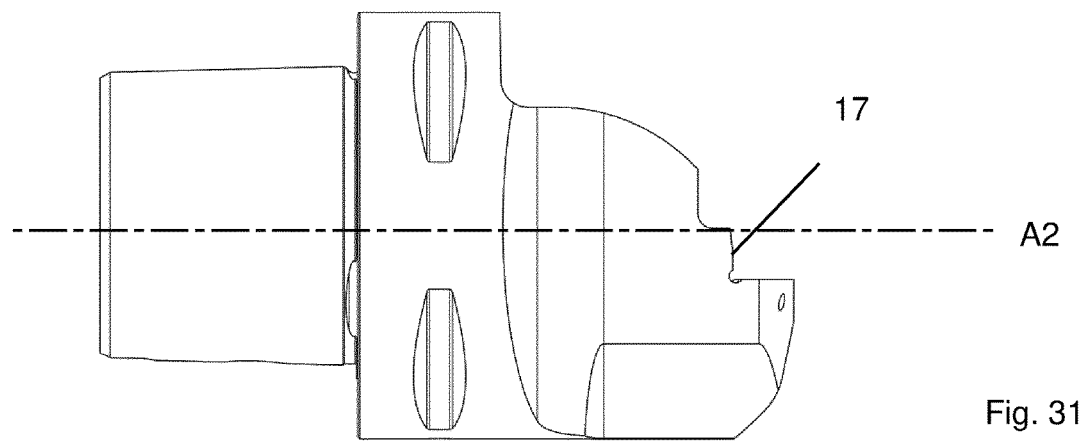
Fig. 31
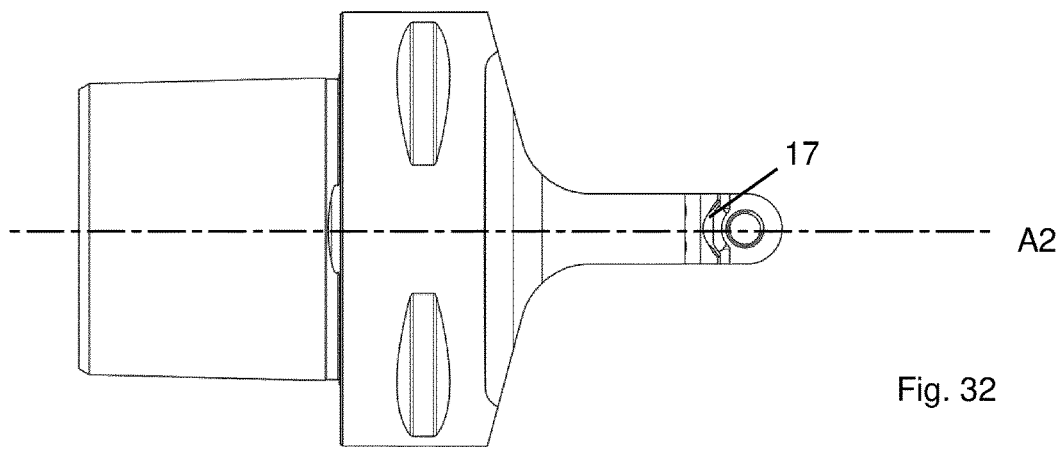
Fig. 32

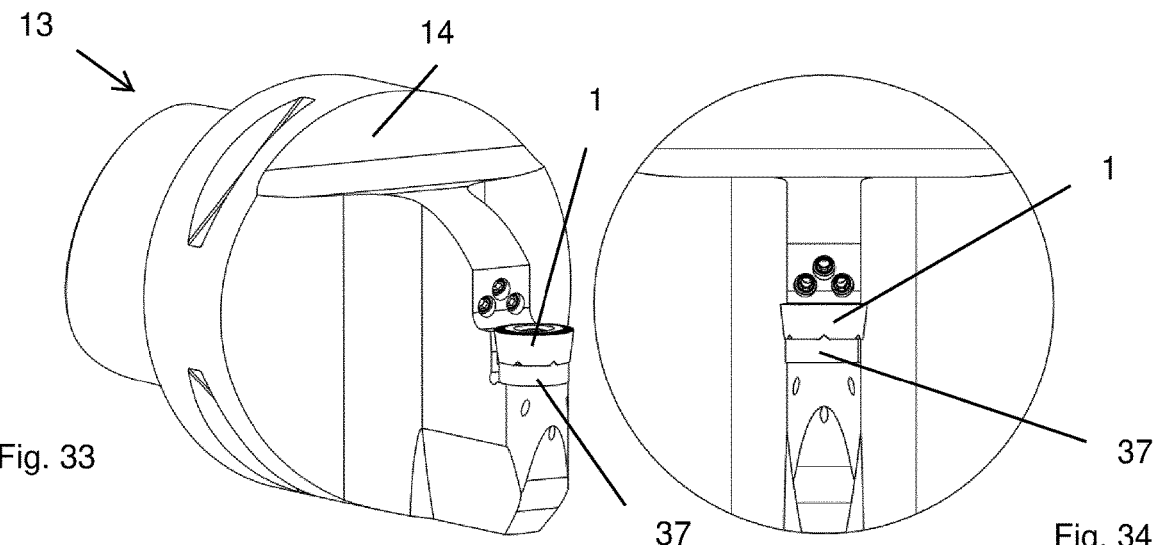
Fig. 33
Fig. 34
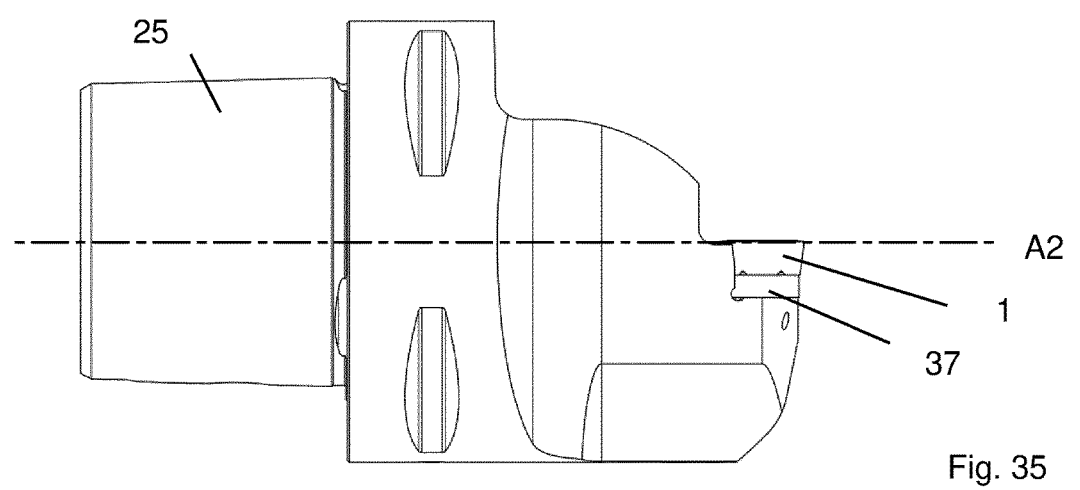
Fig. 35
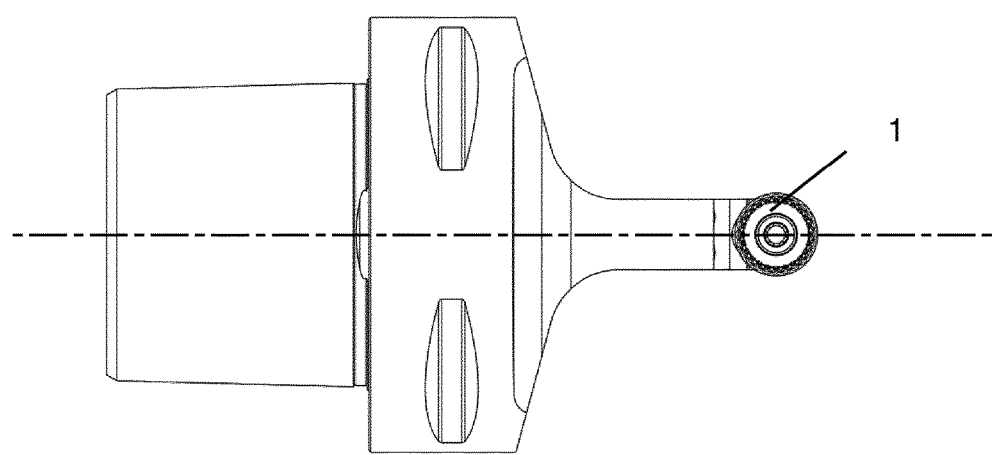
Fig. 36

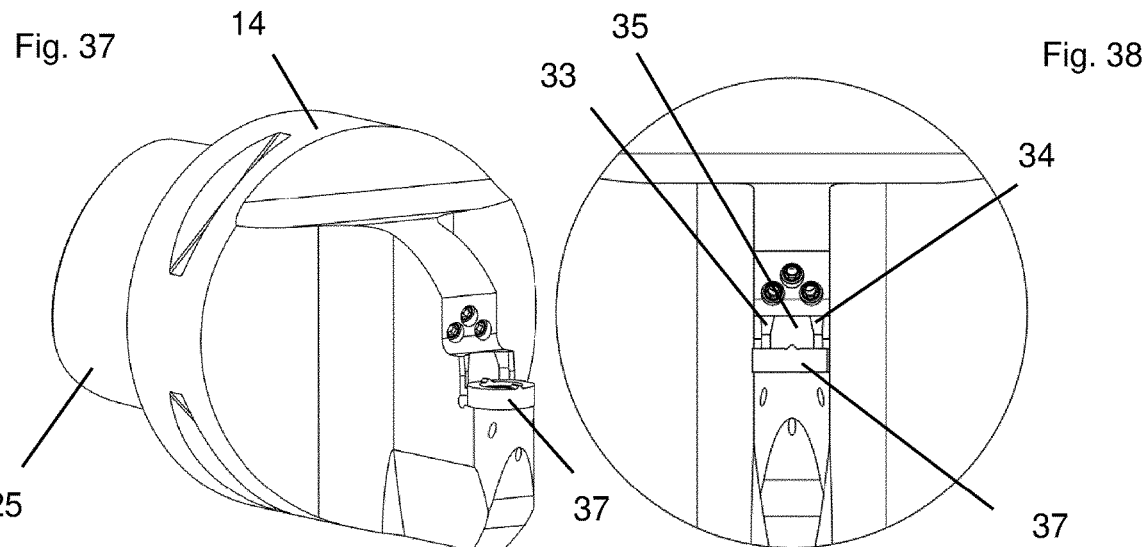
Fig. 37
Fig. 38
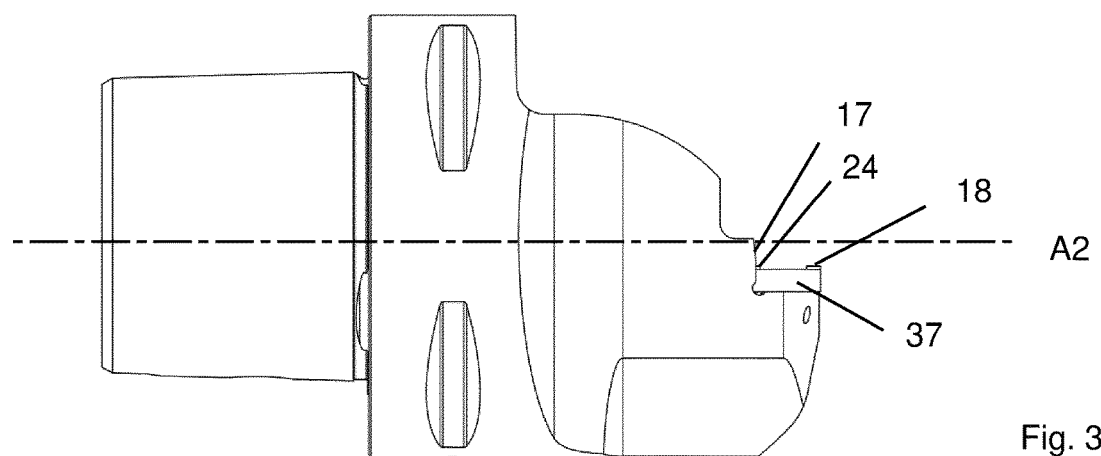
Fig. 39
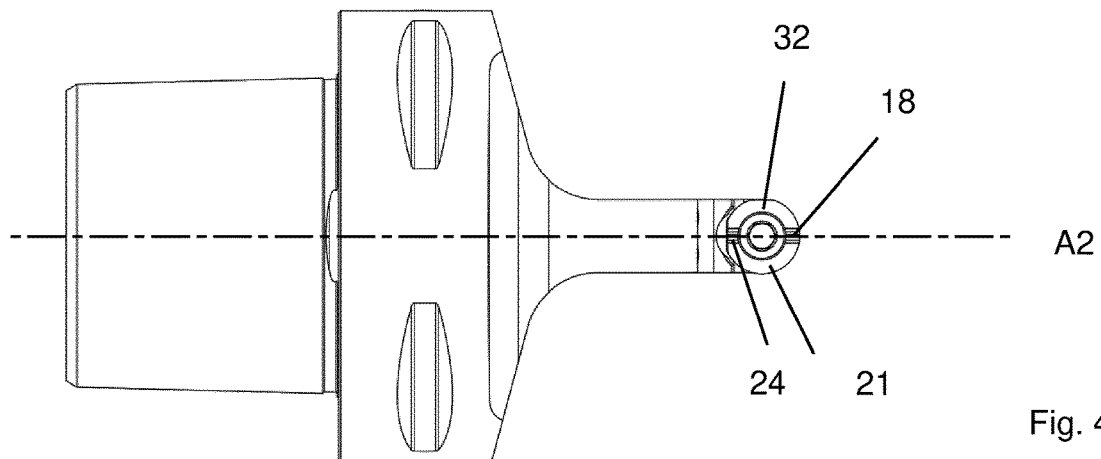
Fig. 40

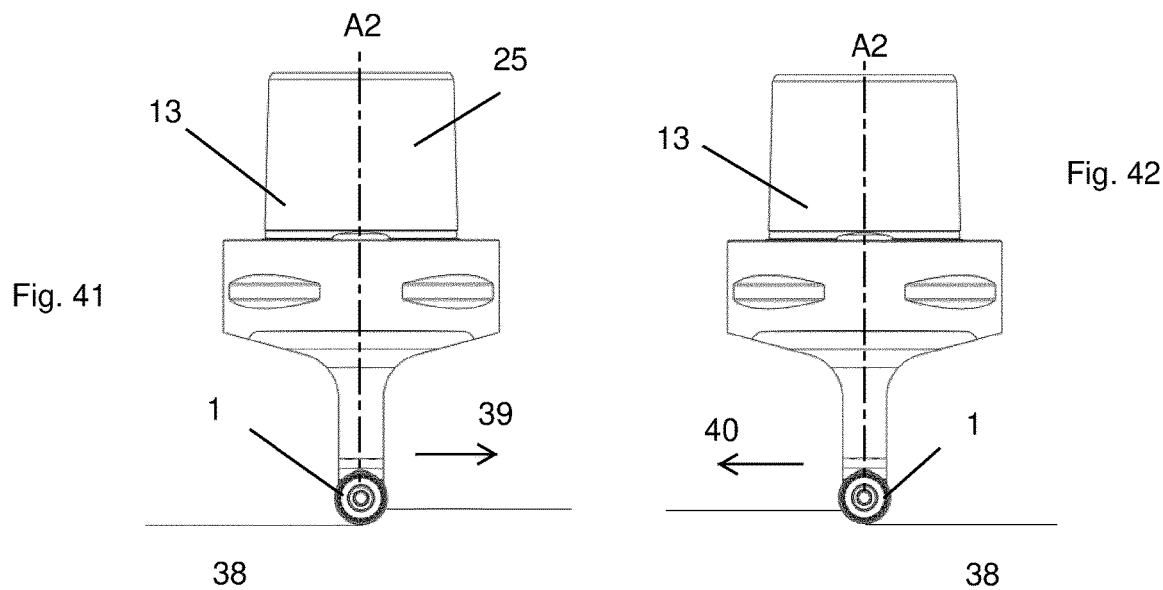
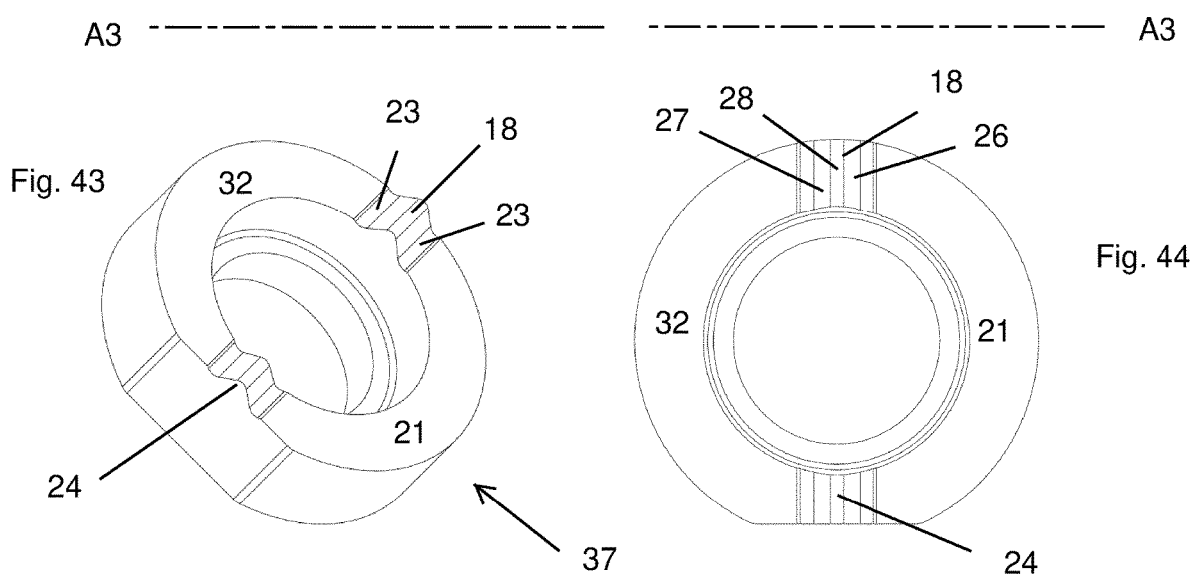
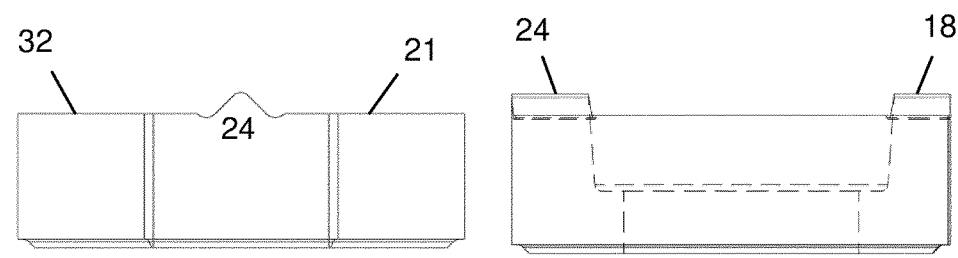

us 12,172,222 B2

TURNING TOOL FOR METAL CUTTING

RELATED APPLICATION DATA

This application is a § 371 National Stage Application of PCT International Application No. PCT/EP2020/052558 filed Feb. 3, 2020 claiming priority to EP 19174811.0 filed May 16, 2019.

TECHNICAL FIELD OF THE INVENTION

The present invention belongs to the technical field of metal cutting. More specifically the present invention belongs to the field of turning tools comprising a turning insert having a circular cutting edge

BACKGROUND OF THE INVENTION AND PRIOR ART

The present invention refers to a turning tool according to the preamble of claim 1. In other words, the present invention relates to a turning tool comprising a tool body and a turning insert, wherein the turning insert comprises a top surface, an opposite bottom surface, a reference plane between the top and bottom surfaces, a center axis intersecting the top and bottom surfaces, a side surface connecting the top surface and the bottom surface, a cutting edge adjacent to the top surface and the side surface, the cutting edge being circular and concentric in relation to the center axis, wherein the bottom surface of the turning insert comprises a set of flat surfaces, wherein the flat surfaces extend in a plane parallel to the reference plance, wherein the turning tool comprises an insert seat, wherein the insert seat comprises a bottom surface, wherein the bottom surface of the insert seat comprises a support surface, wherein the turning insert is mounted in the insert seat by means of a clamping device.

In turning of a metal work piece, the metal work piece rotates around a center axis. A turning tool is used to remove material from the metal work piece. The turning tool normally comprises a turning insert. A turning insert may have different shape, depending on factors such as the type of turning operation and component design. One common type of turning inserts are round turning inserts, i.e. turning inserts having a circular cutting edge.

One known problem for such turning tools relates to unstable fixation of the turning insert.

EP 1 899 098 B1 disclose a turning tool comprising a turning insert having a circular cutting edge. The bottom surface of the turning insert comprises a plurality of radial ridges.

The inventor have found that there is a need for an improved turning tool.

SUMMARY OF THE INVENTION

The inventors have found that the turning tool disclosed in EP 1 899 098 B1 can be improved.

An object of the present invention is to provide a turning tool comprising a round turning insert where the turning insert is indexable in a number of positions, with the purpose of utilizing the chip-removing cutting edge of the turning insert in an optimal way. One further object is to provide a turning tool where rotation of the turning insert in the insert seat during machining is kept to a limited level. One still further object is to provide a turning tool which can be manufactured in an economical way. One still further object is to provide a turning tool which can stand high cutting forces. One still further object is to reduce the risk of vibrations during machining.

At least one of the objects is achieved by a turning tool comprising a tool body and a turning insert, wherein the turning insert comprises a top surface, an opposite bottom surface, a reference plane between the top and bottom surfaces, a center axis intersecting the top and bottom surfaces, a side surface connecting the top surface and the bottom surface, a cutting edge adjacent to the top surface and the side surface, the cutting edge being circular and concentric in relation to the center axis, wherein the bottom surface of the turning insert comprises a set of flat surfaces, wherein the flat surfaces extend in a plane parallel to the reference plane, wherein the turning tool comprises an insert seat, wherein the insert seat comprises a bottom surface, wherein the bottom surface of the insert seat comprises a support surface, wherein the turning insert is mounted in the insert seat by means of a clamping device, wherein the insert seat comprises a rear surface, wherein the side surface of the turning insert is in contact with the rear surface of the insert seat, wherein the bottom surface of the turning insert comprises a set of radial grooves, wherein the radial grooves intersect the side surface, wherein the bottom surface of the insert seat comprises a first ridge, wherein the support surface of the insert seat is planar, wherein the first ridge is inside one of the radial grooves formed in the bottom surface of the turning insert, wherein at least one of the flat surfaces of the turning insert is in contact with the support surface of the insert seat, wherein in a cross section, the first ridge is smaller than of one of the radial grooves.

By such a turning tool, insert rotation risk can be reduced while flat bottom contact surfaces ensures reduced risk of insert breakage or insert seat breakage. By such a turning tool, contact surfaces can be relatively large, thereby improving the stability at high cutting forces. Further, manufacturing of the turning tool can be made in an economical manner because the radial grooves and the first protrusion does not need to have precise and corresponding dimensions. The first ridge and radial groove interaction will prevent the insert from unlimited rotating when used. In order not to get an overestimated and tolerant sensitive system there is preferably a vertical gap between insert and first ridge. This gives the opportunity to increase the tolerance of the radial groove and ridge so that this becomes more production-adapted. This will ensure that there is a good contact between the insert and the insert seat, which give a stable mounting and reduces the risk of vibration. A good contact between the turning insert and the insert seat reduces risk of insert movement and/or vibrations. By having flat bottom contact surfaces, the production and evaluation is simplified. By having a number of radial grooves, the insert can be indexed at a number of times up to the number of radial grooves. The radial grooves gives a simpler and precise indexing. By having a first ridge which is smaller than the radial groove, the risk of tensile stress can be reduced, thereby the risk of insert breakage can be reduced.

The turning tool is suitable to be used in a CNC-lathe and comprises a tool body, preferably made at least partly from steel. The turning insert made at least partly from a more wear resistant material than at least the major part of the tool body. The turning insert preferably comprises a wear resistant material such as cemented carbide, cubic boron nitride or ceramic. The top surface of the turning insert comprises a rake surface. The bottom surface of the turning insert comprises a seating surface. The reference plane is mid-way between the top and bottom surfaces. The center axis intersecting the top and bottom surfaces is perpendicular to the reference plane. Preferably, a through hole is concentric with the center axis. The side surface connecting the top surface and the bottom surface comprises a clearance surface. The side surface is preferably conical. In other words, an area of the the top surface is preferably greater than an area of the bottom surface. A cutting edge is adjacent to, i.e. connects or borders to the top surface and the side surface. The cutting edge is 360° circular in a top view and is concentric in relation to or with the center axis. The cutting edge may be entirely located in a plane parallel to the reference plane. The bottom surface comprises a set of radial grooves. In other words, said grooves extend towards the center axis. Said grooves preferably intersect the side surface. Said grooves preferably have a constant width and height along the length of the groove. Preferably, the set of radial grooves are evenly distributed around the center axis. Preferably, each of said radial grooves are uniform in cross-sections. Preferably, the number of grooves are 6-20, even more preferably 6-12, still even more preferably 6. The bottom surface comprises a set, i.e. at least two, of flat surfaces. Preferably, the number of flat surfaces is equal to the number of grooves. Preferably, the flat surfaces are formed between adjacent pairs of grooves.

The turning tool comprises an insert seat, in which the turning seat can be removeably seated or clamped. The insert seat comprises a bottom surface and a rear surface, wherein the rear surface and the bottom surfaces are support surfaces. The bottom surface of the insert seat comprises a protrusion in the form of a first ridge, and a planar or flat support surface.

Said flat or planar support surface or surfaces are perpendicular to the center axis of the turning insert. Said first ridge is raised in relation to said flat or planar support surface or support surfaces. Said first ridge is thus a protrusion, preferably an elongated protrusion. Preferably, the bottom surface of the insert seat comprises more than one and less than three co-planar support surfaces which are perpendicular to the center axis of the turning insert.

Preferably, the ridge is uniform in cross-sections.

The tool body may comprise the bottom surface and the rear surface. Alternatively, the turning tool may comprise a shim. In such case the bottom surface including the first ridge may be part of or included in the shim, while the rear surface may be included in the tool body.

The turning insert is mounted in the insert seat by means of a clamping device, e.g. a top clamp or a clamping screw.

A portion of the side surface of the turning insert is in contact with a portion of the rear surface of the insert seat.

The first ridge is at least partly inside or within one of the radial grooves formed in the bottom surface of the turning insert.

At least one, preferably all of the flat surfaces of the turning insert is in contact with the support surface or support surfaces.

A cross section of the first ridge is smaller than a corresponding cross section of one of the radial grooves, where said cross sections are perpendicular to a respective main extension axis. In other words, there is a gap between the first ridge and the radial groove. Said cross sections are preferably corresponding or substantially corresponding in shape. The height of the ridge is preferably less than the depth of said grooves, resulting in a vertical gap, where the reference plane is a horizontal plane. The width of the ridge is preferably less than the width of said grooves, resulting in a horizontal gap.

The grooves and the ridge are arranged such that a small rotation, i.e. between 0° and 1°, even more preferably between 0° and 0.5°, of the turning insert around the center axis thereof is possible. The grooves and the ridge are arranged such that a rotation above 1°, preferably above 0.5°, is prevented.

According to an embodiment, the clamping device is in the form of a screw, wherein a hole for the screw is connecting the top and bottom surfaces of the turning insert, wherein a threaded hole intersects the bottom surface of the insert seat.

The clamping device is in the form of a screw, preferably comprising a screw head and an external thread. A through hole for the screw is connecting the top and bottom surfaces of the turning insert. The bottom surface of the insert seat comprises a threaded hole for the screw. The screw is at least partly located inside said hole formed in the insert and at least partly inside said threaded hole.

According to an embodiment, the radial grooves intersect the hole formed in the turning insert.

The radial grooves extend between the hole and the side surface.

According to an embodiment, the bottom surface of the insert seat comprises seat grooves, wherein the first ridge is formed between the seat grooves, wherein the first ridge and the seat grooves are at least partially located on opposite sides in relation to a plane comprising the support surface.

The bottom surface of the insert seat thus comprises seat grooves or recesses on opposite sides of the first ridge formed between the seat grooves. The first ridge is at least partly raised in relation to a plane comprising the support surface. The seat grooves are at least partially sunken in relation to a plane comprising the support surface.

According to an embodiment, wherein the bottom surface of the insert seat comprises a second ridge, wherein the first ridge and the second ridge are aligned.

The first ridge and the second ridges are preferably uniform in cross sections perpendicular to the longitudinal axis of the turning tool. The first ridge and the second ridge are preferably separated by 180° relative to each other around a center axis of the threaded hole formed in the bottom surface of the insert seat, when seen in a top view.

Preferably, the bottom surface of the insert seat comprises exactly two ridges.

Preferably, the first and second ridges are spaced apart. Preferably, the first and second ridges are separated by the threaded hole formed in the bottom surface of the insert seat.

According to an embodiment, the tool body comprises a coupling portion, wherein the coupling portion extends along a longitudinal axis of the turning tool, wherein the first ridge extends primarily along or parallel to the longitudinal axis of the turning tool.

By such a turning tool, insert movements are reduced, for example insert movements parallel to the metal work piece rotational axis in longitudinal turning.

By such a turning tool, manufacturing costs of the turning tool can be reduced because tolerances of the first ridge and/or radial grooves does not need to be narrow.

The tool body comprises a rear end coupling portion which is opposite the front end insert seat. The coupling portion is suitable to be connected to a machine interface of a CNC-lathe. The coupling portion may be tapered or conical. Alternatively, the coupling portion may be square-shaped or rectangular in a cross section. The coupling portion extends along a longitudinal axis of the turning tool. The longitudinal axis is a center axis of the coupling portion. The first ridge has a main extension thereof along or parallel to the longitudinal axis of the turning tool when seen in a top view. The first ridge thus extends in a forward-rearward direction, where the rear end of the turning tool is defined by the coupling portion.

According to an embodiment, the center axis of the turning insert is perpendicular or substantially perpendicular to the longitudinal axis of the turning tool.

According to an embodiment, the first ridge and the radial grooves formed in the bottom surface of the turning insert have corresponding or substantially corresponding shapes in cross sections.

Preferably, said shapes is V-shaped or substantially V-shaped. Preferably, a base of the first ridge is wider that the top or crest of the first ridge.

According to an embodiment, the number of ridges formed in the bottom surface of the insert seat is smaller than the number of radial grooves formed in the bottom surface of the turning insert.

Preferably, the number of ridges are more than one and less than three. Preferably, the number of radial grooves is even. Preferably, the number of radial grooves are 6-20, even more preferably 6-12, still even more preferably 6.

According to an embodiment, the first ridge comprises ridge side surfaces connected by a ridge crest, wherein the ridge side surfaces are planar or substantially planar, wherein the ridge side surfaces form an angle of 70-110° in relation to each other, wherein each radial groove comprises radial groove side surfaces connected by a radial groove root, wherein the radial groove side surfaces form an angle of 70-110° in relation to each other.

The ridge crest is preferable arc-shaped in a cross section. The radial groove root is preferably arc-shaped in a cross section. The ridge crest is spaced apart from the radial groove root. In other words, there is a gap between the radial groove root and the ridge crest. One of said ridge side surfaces is adjacent to one of said radial groove side surfaces, while a second of said ridge side surfaces is adjacent to a second of said radial groove side surfaces. In other words, there are two pairs of adjacent ridge side- and radial groove side surfaces. There is a gap between at least one of said pairs of adjacent surfaces.

By such a turning tool, the risk of insert breakage due to high tensile stress is reduced.

According to an embodiment, a cross section of each radial groove is uniform or substantially uniform, where a cross section of the first ridge is uniform or substantially uniform.

Said cross sections are uniform along the entire length of the ridge and groove, respectively.

According to an embodiment, the tool body comprises exactly one insert seat.

The tool body comprises exactly one insert seat, in which exactly one turning insert is mounted.

According to an embodiment, the bottom surface of the insert seat comprises two support surfaces, wherein the support surfaces are located in a common plane, wherein in a top view, an area of the support surfaces are greater than an area of the ridge or ridges.

Thus, in a top view a projected area of the support surfaces is greater than a projected area of the first and second ridges.

According to an embodiment, the rear surface of the insert seat comprises two spaced apart rear contact surfaces, wherein the rear contact surfaces are separated by a recess.

According to an embodiment, a method to machine a metal work piece comprises the steps of providing a metal work piece, providing the above described turning tool, rotating the metal work piece around a rotational axis thereof, cutting the metal work piece by moving the turning tool in a first direction parallel to the rotational axis of the metal work piece, wherein one ridge side surface is in contact with one radial groove side surface, wherein a second ridge side surface is spaced apart from a second radial groove side surface.

The metal work piece rotates in the same direction around the rotational axis thereof during the machining in the first and second directions.

DESCRIPTION OF THE DRAWINGS

The present invention will now be explained in more detail by a description of embodiments of the invention and by reference to the accompanying drawings.

FIG. 5 is a is a cross-sectional view taken along line 5-5 of FIG. 3
FIG. 6 is a is a cross-sectional view taken along line 6-6 of FIG. 3
FIG. 7 is a perspective view of the turning insert in FIG. 1 where the bottom surface is shown
FIG. 8 is a bottom view of the turning insert in FIG. 1
FIG. 25 is a perspective view of a turning tool comprising the tool body in FIG. 21 and the turning insert in FIG. 1
FIG. 26 is a front view of FIG. 25
FIG. 27 is a side view of FIG. 25
FIG. 28 is a top view of FIG. 25
FIG. 29 is a perspective view of a tool body
FIG. 30 is a front view of FIG. 29
FIG. 31 is a side view of FIG. 29
FIG. 32 is a top view of FIG. 29
FIG. 33 is a perspective view of a turning tool comprising the tool body in FIG. 29, the turning insert in FIG. 1 and the shim in FIG. 43
FIG. 34 is a front view of FIG. 33
FIG. 35 is a side view of FIG. 33
FIG. 36 is a top view of FIG. 33
FIG. 37 is a perspective view of the tool body in FIG. 29 and the shim in FIG. 43
FIG. 38 is a front view of FIG. 37
FIG. 39 is a side view of FIG. 37

FIG. 40 is a top view of FIG. 37

FIG. 41 is a schematic view of turning using the turning tool in FIG. 25

FIG. 42 is a schematic view of turning using the turning tool in FIG. 25

FIG. 43 is a perspective view of a shim

FIG. 44 is a top view of the shim in FIG. 43

FIG. 45 is a front view of the shim in FIG. 43

FIG. 46 is a transparent side view of the shim in FIG. 43

Figure 1:
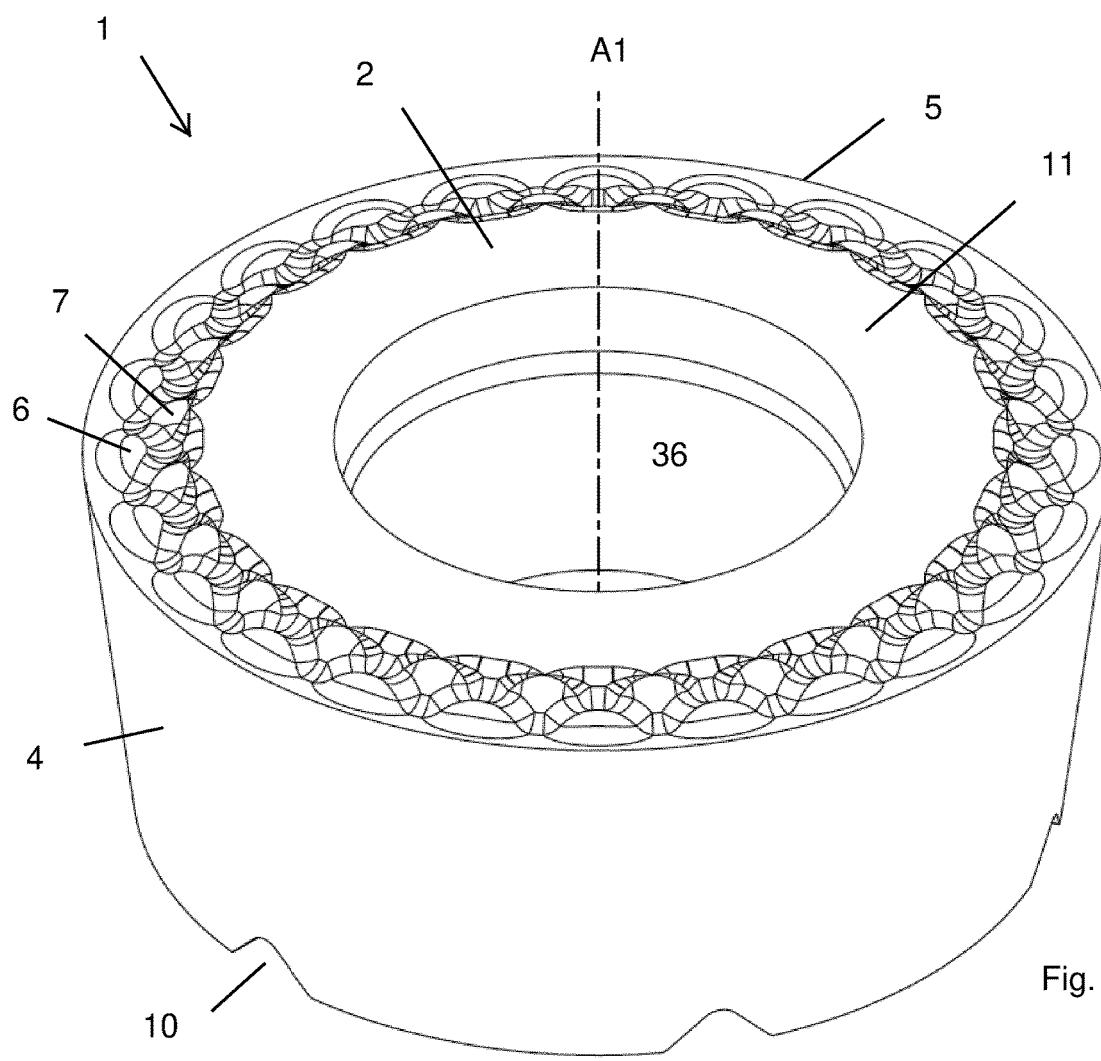
FIG. 1 is a perspective view of a turning insert
Figure 2:
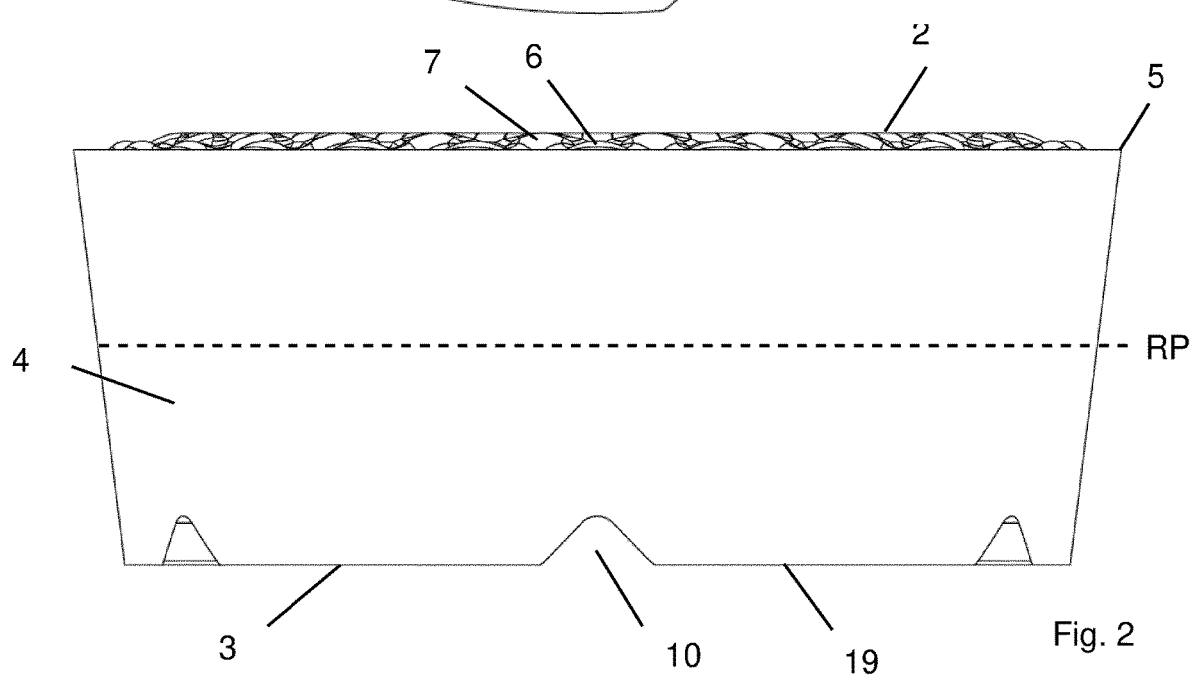
FIG. 2 is a front view of the turning insert in FIG. 1

All turning insert figures have been drawn to scale.

DETAILED DESCRIPTION OF EMBODIMENTS OF THE INVENTION

Reference is made to FIGS. 1-3, 7 and 8 which show a turning insert 1. The turning insert 1 comprises a top surface 2 comprising a rake surface and an opposite bottom surface 3 functioning as a seating surface. A reference plane RP extends mid-way between the top and bottom surfaces 2, 3. A center axis A1 intersects the top and bottom surfaces 2, 3. A side surface 4 connects the top surface 2 and the bottom surface 3. A cutting edge 5 is adjacent to the top surface 2 and the side surface 4. The cutting edge 5 is circular and concentric in relation to a center axis A1. A through hole 36 for a screw extends between the top and bottom surfaces 2, 3. The top surface 2 comprises a set of first protrusions 6.

As can be seen in FIGS. 5 and 6, a greatest distance from the reference plane RP to the first protrusions 6 is greater than a distance from the reference plane RP to the cutting edge 5.

As can best be seen in e.g. FIG. 8, the bottom surface 3 comprises a set of radial grooves 10 and a set of flat surfaces 19. The flat surfaces 19, arranged to function as support surfaces or contact surfaces, extend in a plane parallel to the reference plane RP.

Figure 3:
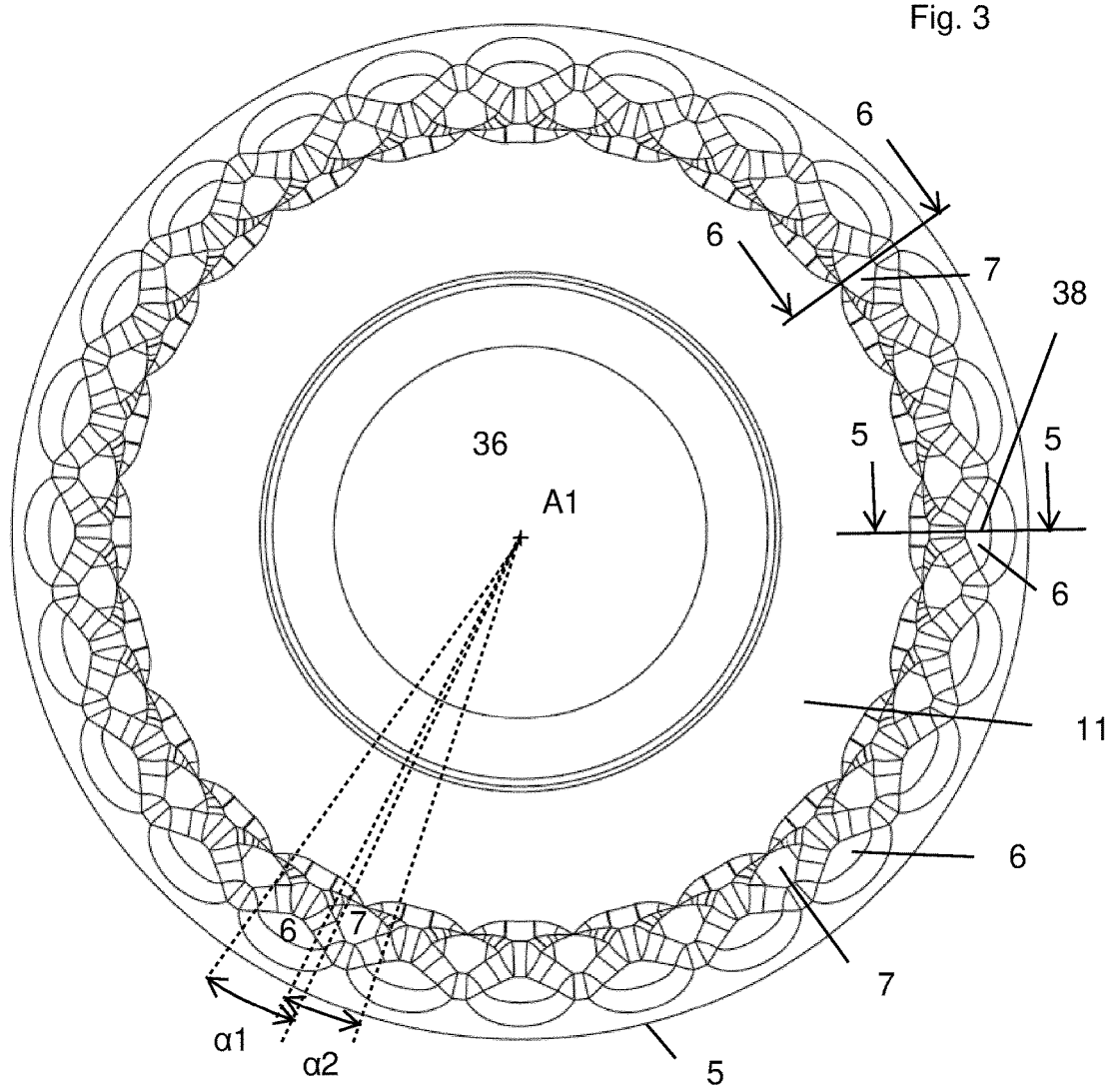
FIG. 3 is a top view of the turning insert in FIG. 1

In a top view as in FIG. 3, each first protrusion 6 is symmetrical in relation to a line extending between the center axis A1 and a mid-point 45 of the first protrusion 6. The first protrusions 6 are elongated in a direction parallel to or substantially parallel to the adjacent cutting edge 5.

The number of first protrusions 6 is a multiple of the number of radial grooves 10.

Figure 4:
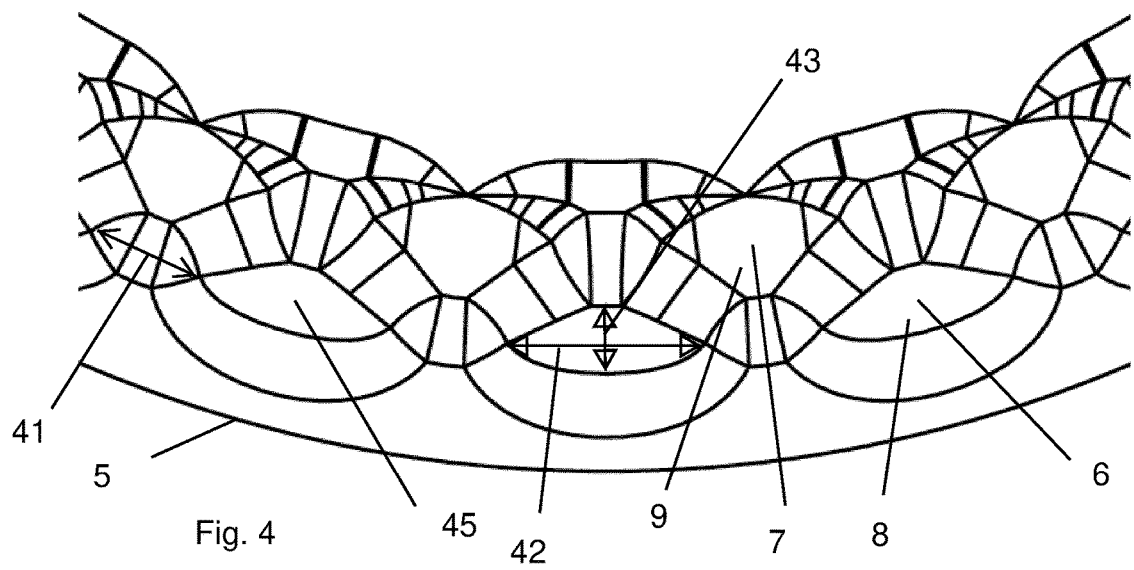
FIG. 4 is a magnified view of a section of FIG. 3

As can be seen in FIG. 4, a distance 41 between adjacent first protrusions 6 is smaller than a length 42 of a first protrusion 6.

As seen in FIG. 5, each first protrusion 6 is convex in a radial cross section.

The first protrusions 6 are evenly distributed around the center axis A1, and are located at constant distance from the center axis A1.

As can be seen in FIG. 3, a radial angle α1 for a first protrusion 6 is greater than a radial angle α2 of a second protrusion 7, where said angles are measured between radial lines intersecting end points of the respective protrusion 6, 7. The first and second protrusions 6, 7 radially overlap when seen in a top view. The sum of radial angles α1, α2 for the first protrusions 6 and the second protrusions 7 exceeds 360°.

The first and the second protrusions 6, 7, respectively, are uniformly distributed around the center axis A1.

As can be seen in e.g. FIG. 3 the top surface 2 of the turning insert 1 is mirror symmetrical in relation to a plane comprising the center axis A1. The number of first protrusions 6 is equal to the number of second protrusions 7. The first protrusions 6 are identical. The second protrusions 7 are identical.

In a top view the first protrusions 6 are oval shaped or substantially oval shaped. Said oval is in a top view elongated in a direction perpendicular to a radius intersecting a mid-point of the respective first protrusion, where said radius intersects the center axis. In other words, a length 42 of a first protrusion 6 is greater than a width 43 of a first protrusion 6, where said width 43 is measured radially in a top view and where said length is measured perpendicular to said width 43, as seen in FIG. 4.

The top surface 2 comprises a set of second protrusions 7. As can be seen in e.g. FIG. 3, a greatest distance from the cutting edge 5 to the first protrusions 6 is smaller than a greatest distance from the cutting edge 5 to the second protrusions 7. In other words, the first protrusions 6 are closer to the cutting edge 5, while the second protrusions 7 are closer to the center axis A1. As can be seen in FIGS. 5 and 6, the top surface 2 slopes downwards from the cutting edge 5.

As seen in FIGS. 5 and 6, a distance from the reference plane to the first protrusions 6 is smaller than a distance from the reference plane to the second protrusions 7. As seen in e.g. FIG. 5, the first protrusion 6 comprises a first surface 8 facing the cutting edge 5. As seen in e.g. FIG. 6, the second protrusions 7 comprises a second surface 9 facing the cutting edge 5. A greatest angle e1 of the first surface 8 in relation to the reference plane RP is smaller than a greatest angle e2 of the second surface 9 in relation to the reference plane RP.

The first protrusions 6 are smaller in width, i.e. radially, than the width of the second protrusions 7 when seen in a top view.

The first protrusions 6 are at a constant distance or substantially constant distance from the center axis A1.

The second protrusions 7 are at a constant distance or substantially constant distance from the center axis A1.

The second protrusions 7 extend radially from a circular or substantially circular ring 11, i.e. a ring-shaped protrusion, concentric with the center axis A1. The first protrusions 6 are spaced apart from said circular ring 11.

The radial grooves 10 are aligned with mid-points of first or second protrusions 6, 7.

FIGS. 25-28 show a turning tool 13 comprising a tool body 14 and the above described turning insert 1. The tool body 14 is shown in detail in FIGS. 21-24. The turning tool 13 comprises an insert seat 15. The insert seat 15 comprises a bottom surface 16 and a rear surface 17. The turning insert 1 is mounted in the insert seat 15.

The bottom surface 16 of the insert seat 15 comprises a first ridge 18.

The side surface 4 of the turning insert 1 is in contact with the rear surface 17 of the insert seat 15, The first ridge 18 is inside one of the radial grooves 10 formed in the bottom surface 3 of the turning insert 1.

The grooves and the ridge are arranged such that a small rotation, i.e. between 0° and 1°, even more preferably between 0° and 0.5°, of the turning insert around the center axis thereof is possible. The grooves and the ridge are arranged such that a rotation above 1°, preferably above 0.5°, is prevented.

The bottom surface 16 of the insert seat 15 comprises support surfaces 21, 32 extending in a common plane. The flat surfaces 19 of the turning insert 1 is in contact with the support surfaces 21, 32.

The turning insert 1 is mounted in the insert seat 15 by means of a screw (not shown).

Figure 9:
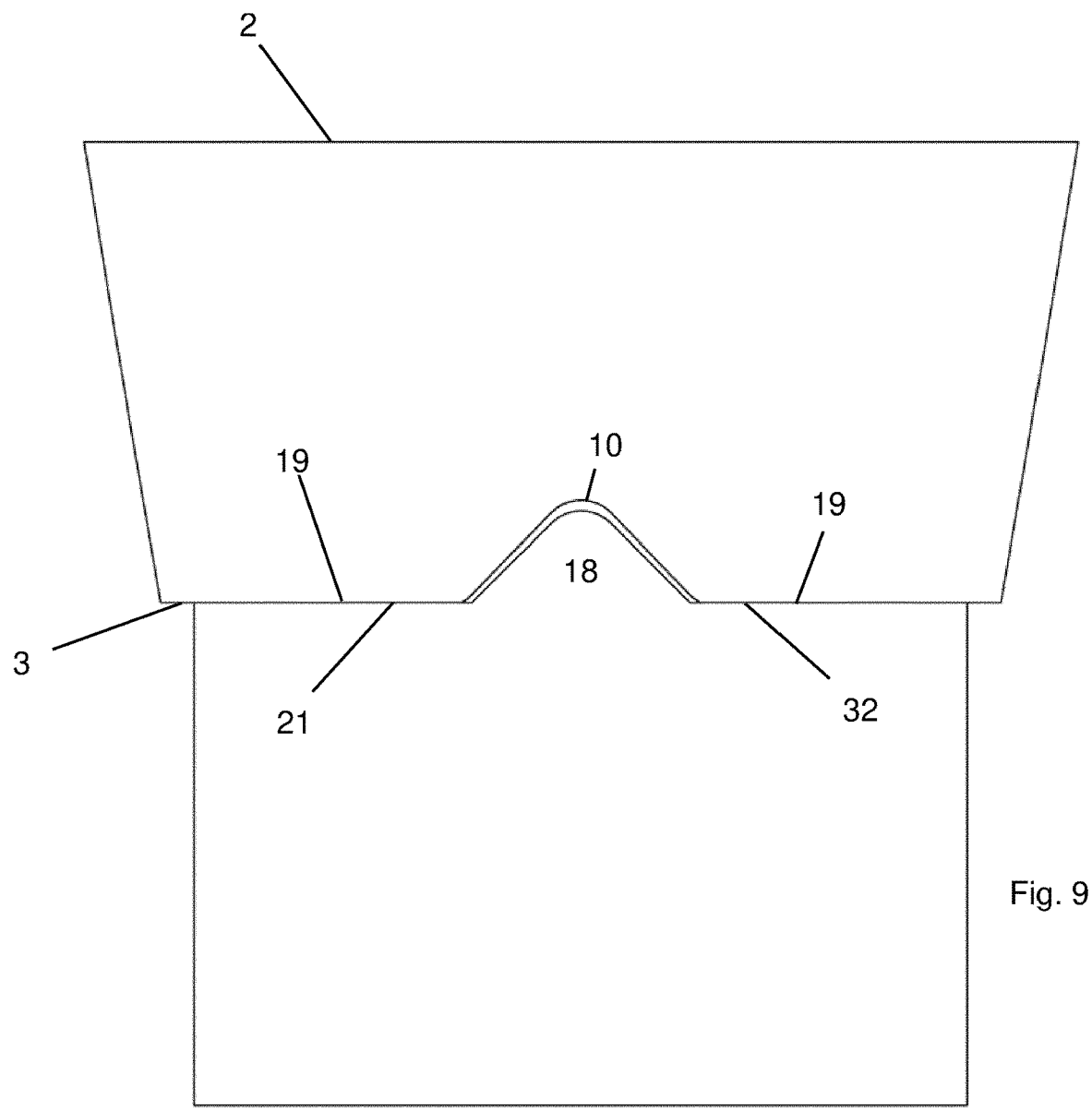
FIG. 9 is a schematic cross-sectional view of a turning insert mounted in an insert seat
Figure 10:
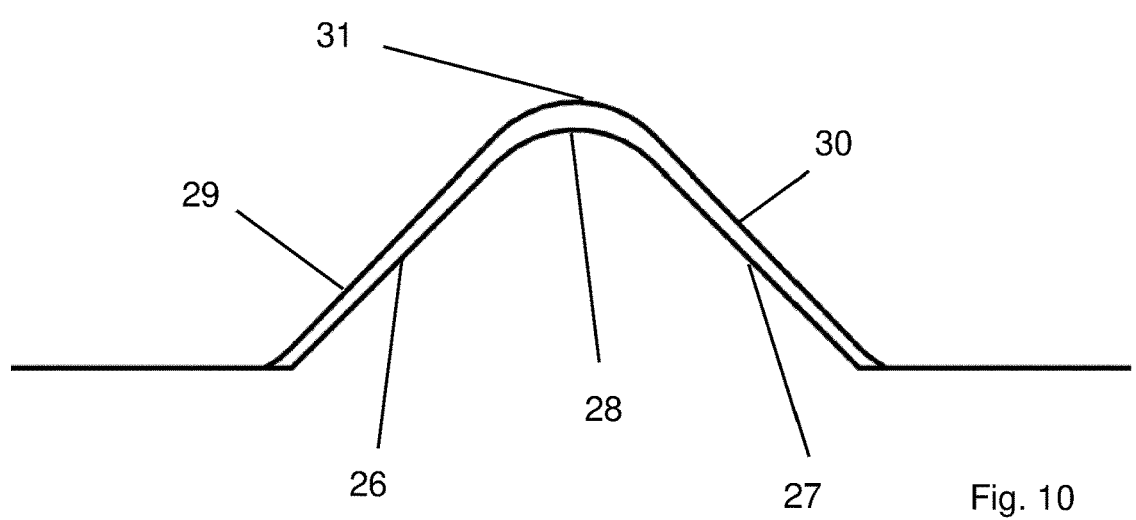
FIG. 10 is a magnified view of a section of FIG. 9

As seen in FIGS. 9 and 10, the first ridge 18 is smaller than one of the radial grooves 10 when seen in a cross-section perpendicular to the main extension of said one of the radial grooves 10. Said first ridge 18 is inside or contained within said one of the radial grooves 10.

A hole 36 for the screw is connecting the top and bottom surfaces 2, 3 of the turning insert 1. A threaded hole 22 for said screw intersects the bottom surface 16 of the insert seat 15.

The screw preferably comprises a screw head and an external thread. A through hole 36 for the screw is connecting the top and bottom surfaces 2, 3 of the turning insert 1. The bottom surface 16 of the insert seat 15 comprises a threaded hole 22 for the screw. The screw is at least partly located inside said hole 36 formed in the insert and at least partly inside said threaded hole 22.

The radial grooves 10 intersect the hole 36 formed in the turning insert 1. The radial grooves 10 extend radially between the hole 36 and the side surface 4.

The bottom surface 16 of the insert seat 15 comprises seat grooves 23. The first ridge 18 is formed between the seat grooves 23. The first ridge 18 and the seat grooves 23 are at least partially located on opposite sides in relation to a plane comprising the support surfaces 21, 32.

Figure 14:
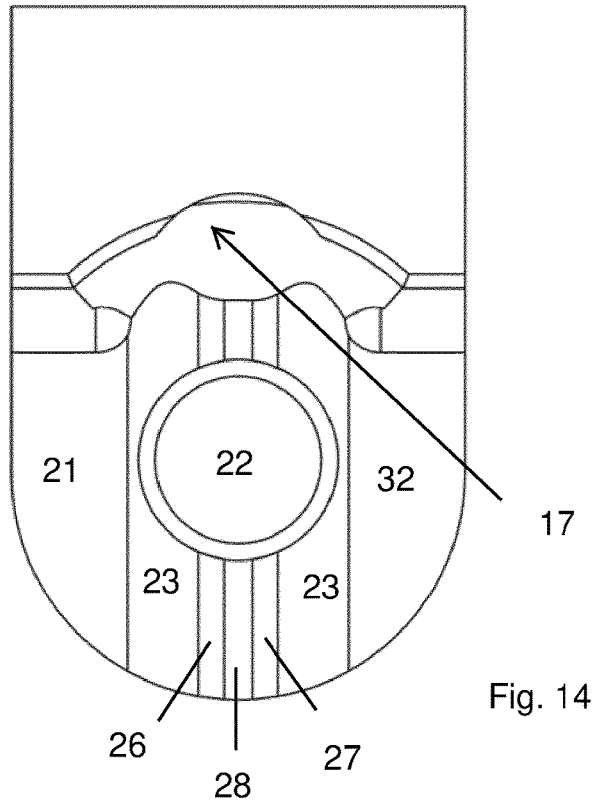
FIG. 14 is a top view of FIG. 13
Figure 15:
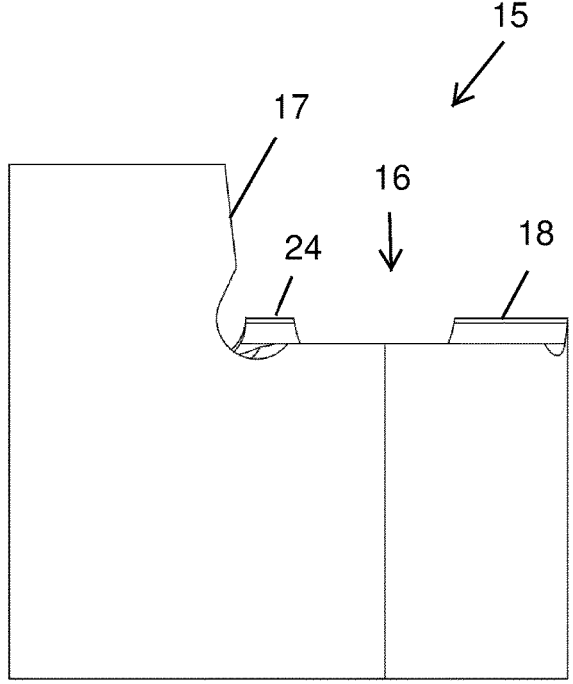
FIG. 15 is a side view of FIG. 13
Figure 16:
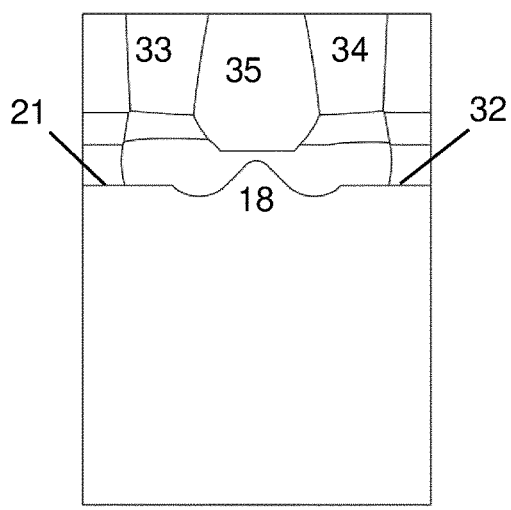
FIG. 16 is a front view of FIG. 13
Figures 17, 18:
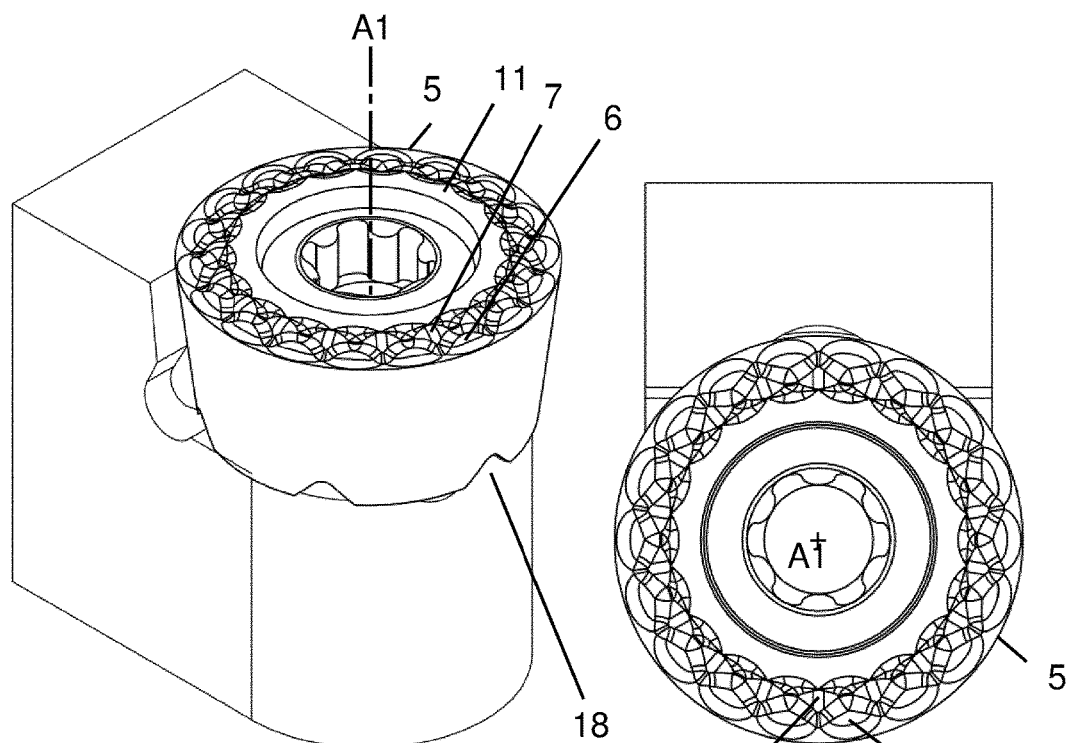
FIG. 17 is a perspective view of the insert seat in FIG. 13 and the turning insert in FIG. 1
FIG. 18 is a top view of FIG. 17
Figures 19, 20:
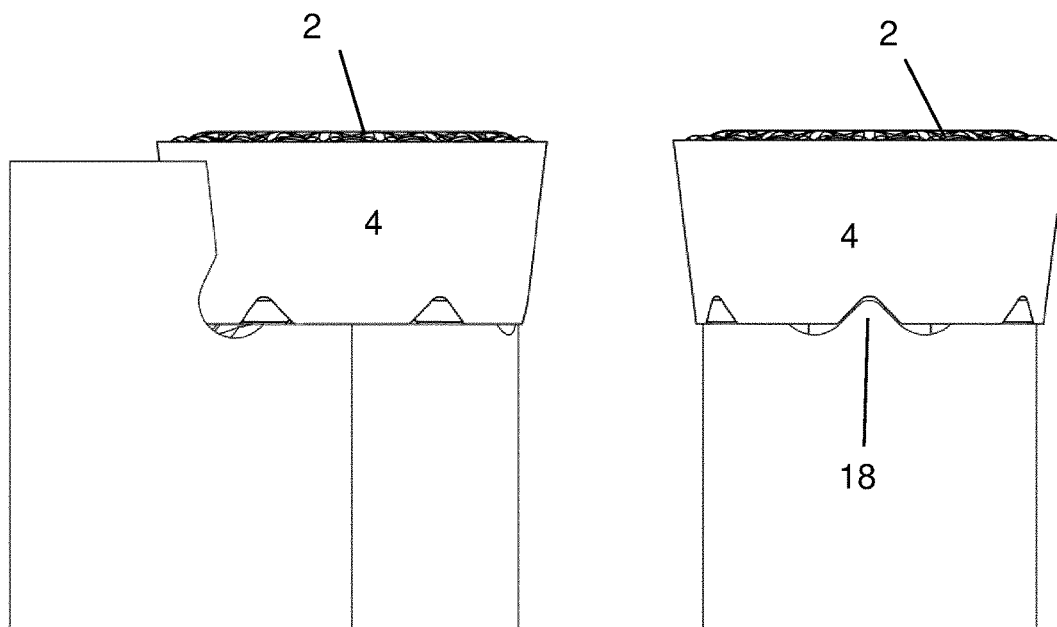
FIG. 19 is a side view of FIG. 17
FIG. 20 is a front view of FIG. 17
Figure 21:
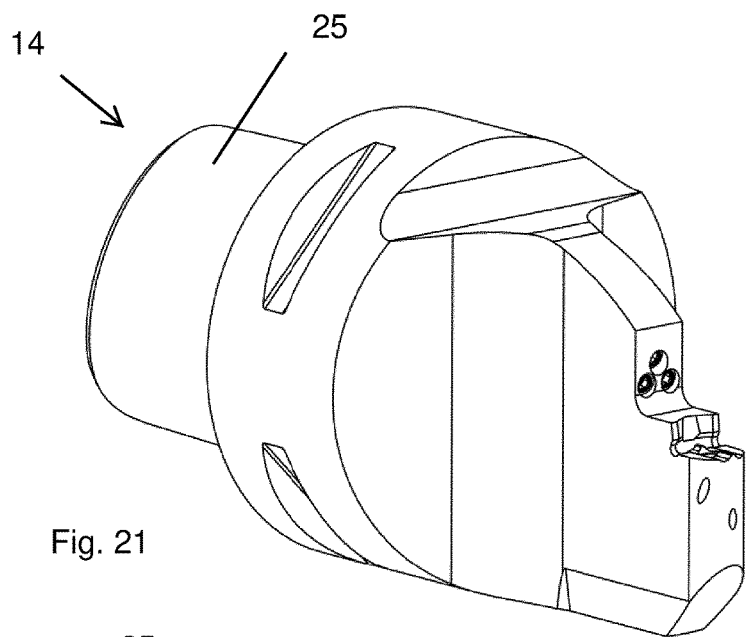
FIG. 21 is a perspective view of a tool body comprising the insert seat in FIG. 13
Figure 22:
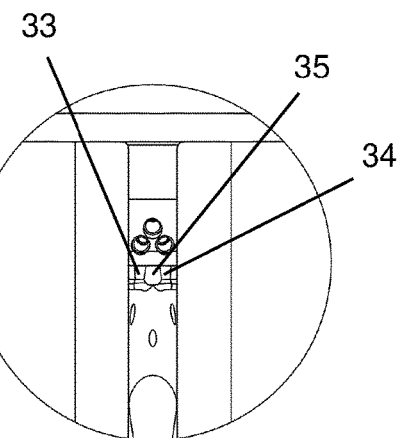
FIG. 22 is a front view of FIG. 21
Figure 23:
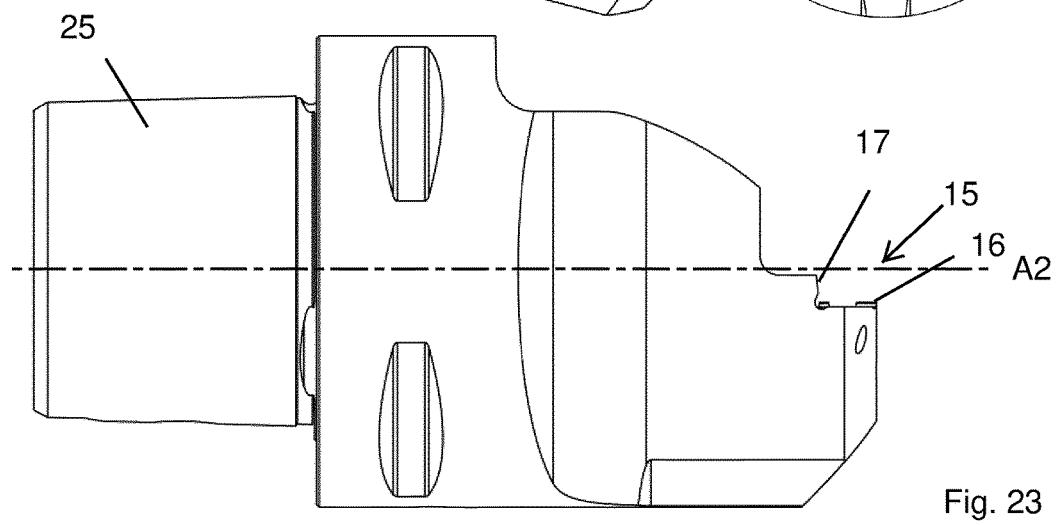
FIG. 23 is a side view of FIG. 21
Figure 24:
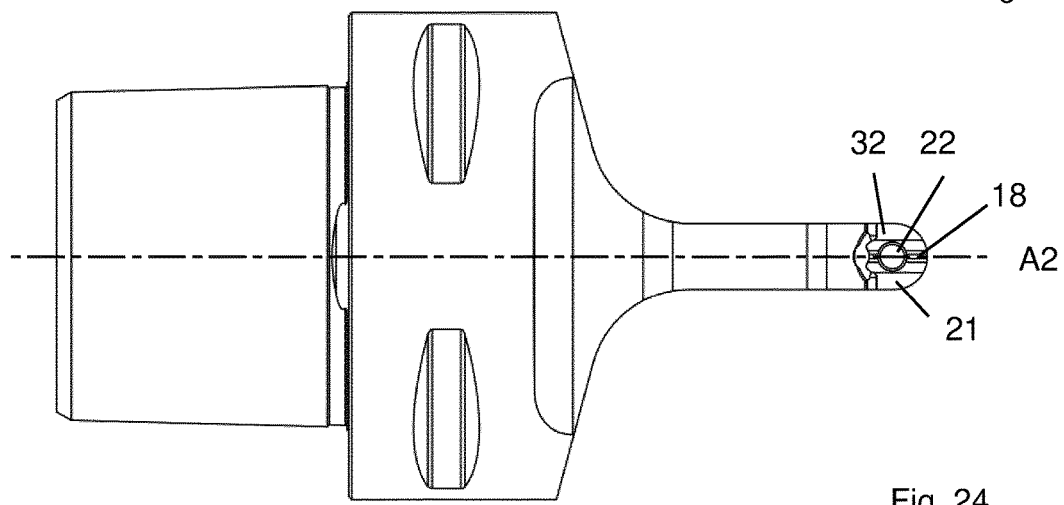
FIG. 24 is a top view of FIG. 21

The bottom surface 16 of the insert seat 15 comprises a second ridge 24. The first ridge 18 and the second ridge 24 are aligned in a top view as seen in e.g. FIG. 14. The first and second ridges 18, 24 are spaced apart and separated by the hole 22 formed in the bottom surface 16 of the insert seat 15. The first ridge 18 is longer than the second ridge 24 when seen in a top view. The first ridge 18 and the second ridge 24 are separated by 180° in a top view. The The first ridge 18 and the second ridge 24 are aligned with the longitudinal axis A2 of the turning tool 13, or aligned with a line parallel to said longitudinal axis A2, when seen in a top view.

The tool body 14 comprises a rear end coupling portion 25 suitable to be connected to a machine interface (not shown) of a CNC-lathe (not shown). The coupling portion 25 extends along a longitudinal axis A2 of the turning tool 13. The first and second ridges 18, 24 extends primarily along or parallel to the longitudinal axis A2 of the turning tool 13.

The first ridge 18 has a main extension thereof along or parallel to the longitudinal axis A2 of the turning tool 13 when seen in a top view.

The center axis A1 of the turning insert 1 is perpendicular or substantially perpendicular to the longitudinal axis A2 of the turning tool 13.

The first ridge 18, the second ridge 24 and the radial grooves 10 formed in the bottom surface 3 of the turning insert 1 have corresponding or substantially corresponding shapes in cross sections, as seen in FIGS. 9 and 10.

The number of ridges 18, 24 formed in the bottom surface 16 of the insert seat 15 is smaller than the number of radial grooves 10 formed in the bottom surface 3 of the turning insert 1.

As seen in FIGS. 9 and 10, the first ridge 18 comprises planar ridge side surfaces 26, 27 connected by a ridge crest 28. The ridge side surfaces 26, 27 form an angle of 70-110° in relation to each other. Each radial groove 10 comprises radial groove side surfaces 29, 30 connected by a radial groove root 31. The radial groove side surfaces 29, 30 form an angle of 70-110° in relation to each other. Each radial groove 10 is uniform or substantially uniform in cross sections along the length of the radial groove, where the length is in a radial direction. In a corresponding manner, the first and second ridges 18, 24 are uniform or substantially uniform.

A gap is formed at least between one of the pair of adjacent ridge side- and radial groove side surfaces 26, 29, 27, 30. In FIG. 10, a gap is formed between both of said adjacent pairs of side surfaces 26, 29, 27, 30. A gap is always formed between the ridge crest 28 and the radial groove root 31.

The bottom surface 16 of the insert seat 15 comprises two support surfaces 21, 32 located in a common plane. In a top view as seen in e.g. FIG. 14, an area of the support surfaces 21, 32 are greater than an area of the ridge or ridges 18, 24.

As seen in e.g. 16, the rear surface 17 of the insert seat 15 comprises two spaced apart rear contact surfaces 33, 34. The rear contact surfaces 33, 34 are separated by a recess 35.

The tool body 14 may comprise the insert seat 15 as seen in FIGS. 21-24. In such a case, the bottom surface 3 and the side surface 4 of the turning insert 1 is partly in contact with the tool body 14, as seen in FIGS. 25-28. Alternatively, the turning tool 13 may comprise a shim 37, such as the shim 37 shown in FIGS. 43-46. In such case, as seen in FIGS. 33-36, the bottom surface 3 of the turning insert 1 is in contact with the shim 37, while the side surface 4 of the turning insert 1 is in contact with the tool body 14.

FIGS. 41 and 42 schematically show a method to machine a metal work piece 38 by means of any of the above described turning tools 13. The metal work piece 38 rotates in one direction around a rotational axis A3 thereof. The first ridge is oriented perpendicular to the rotational axis A3 of the metal work piece 38. Cutting the metal work piece 38 is made by first moving the turning tool 13 in a first direction 39 parallel to the rotational axis A3 of the metal work piece 38, and thereafter cutting the metal work piece 38 by moving the turning tool 13 in a second direction 40 parallel to the rotational axis A3 of the metal work piece 38, where the second direction 40 is opposite to the first direction 39.

Figure 11:
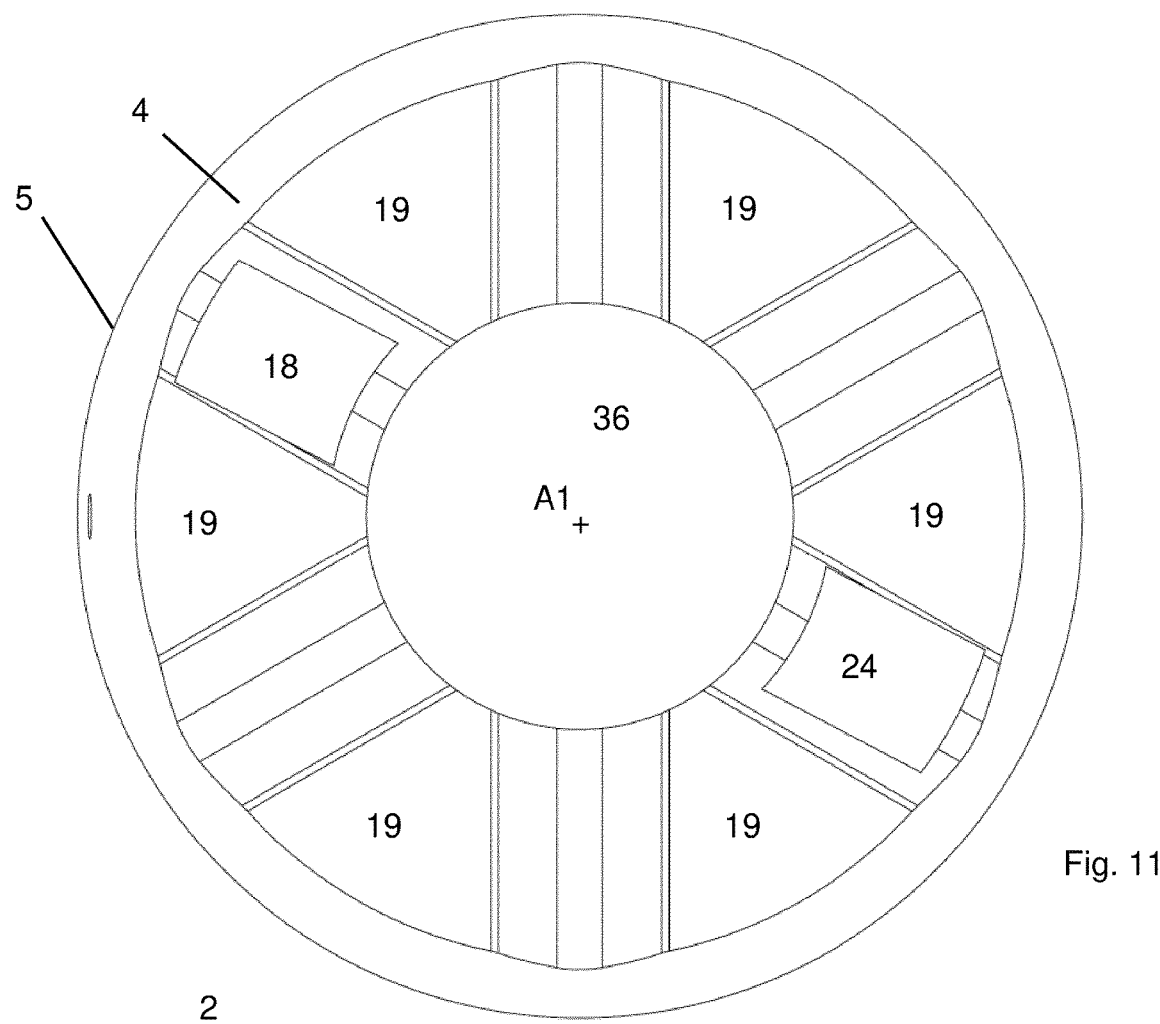
FIG. 11 is a bottom view of the turning insert in FIG. 1 and portions of a bottom surface of an insert seat
Figure 12:
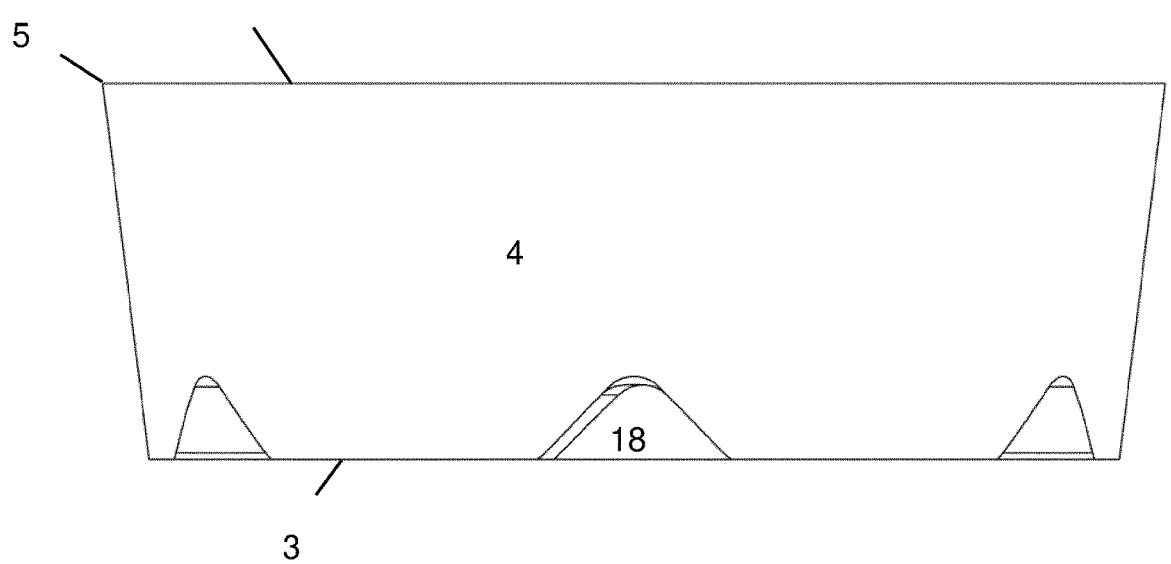
FIG. 12 is a side view of FIG. 11
Figure 13:
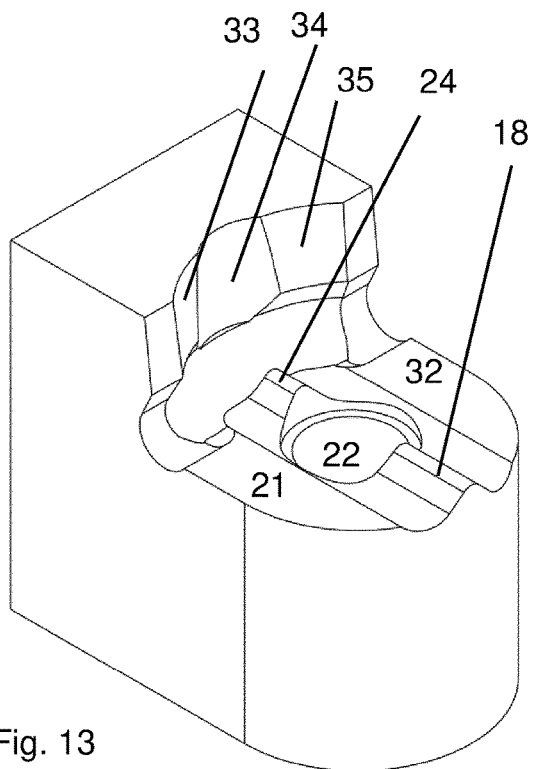
FIG. 13 is a perspective view of an insert seat for the turning insert in FIG. 1

In FIG. 41, one ridge surface 27 as seen in FIG. 10 is in contact with one radial groove side surface 30, while in FIG. 42, one other ridge surface 26 is in contact with one other radial groove side surface 29. Thus, the turning insert have made a rotational movement of a predetermined angle around the center axis thereof when comparing the end of the pass shown in FIG. 41 and the end of the pass shown in FIG. 42. In other words, in FIG. 41, there is at least a partial gap between the other ridge surface 26 and the one other radial groove side surface 29. In a corresponding manner, in FIG. 42 there is at least a partial gap between said one ridge surface 27 and said one radial groove side surface 30. In other words, the ridge crest 28 seen in FIG. 10 forms an angle in a top view in relation to the radial groove root 31. This can be understood from FIG. 11.

The invention claimed is:

1. A turning tool comprising:
    a tool body;
    a turning insert, the turning insert including a top surface, an opposite bottom surface, a reference plane extending between the top and bottom surfaces, a center axis intersecting the top and bottom surfaces, a side surface connecting the top surface and the bottom surface, and a cutting edge adjacent to the top surface and the side surface, the cutting edge being circular and concentric in relation to the center axis, wherein the bottom surface of the turning insert includes a set of flat surfaces, wherein the flat surfaces extend in a plane parallel to the reference plane; and
    an insert seat, wherein the insert seat includes a bottom surface, wherein the bottom surface of the insert seat includes a support surface, wherein the turning insert is mounted in the insert seat by a clamping device, the insert seat including a rear surface, wherein the side surface of the turning insert is in contact with the rear surface of the insert seat, wherein the bottom surface of the turning insert includes a set of radial grooves, wherein the radial grooves intersect the side surface, wherein the bottom surface of the insert seat includes a first ridge, wherein the support surface of the insert seat is planar, wherein the first ridge is arranged to be positioned inside one of the radial grooves formed in the bottom surface of the turning insert, wherein at least one of the flat surfaces of the turning insert is in contact with the support surface of the insert seat, and wherein in a cross section, the first ridge is smaller than one of the radial grooves, wherein the tool body includes a coupling portion, wherein the coupling portion extends along a longitudinal axis of the turning tool, wherein in a top view, an area of the support surfaces are greater than an area of the ridge or ridges, wherein the bottom surface of the insert seat includes a second ridge, wherein the first ridge and the second ridge are aligned, wherein the first ridge extends primarily along or parallel to the longitudinal axis of the turning tool, and wherein the bottom surface of the insert seat includes two support surfaces, wherein the support surfaces are located in a common plane.

2. The turning tool according to claim 1, wherein the clamping device is a screw, wherein a hole for the screw is connecting the top and bottom surfaces of the turning insert, wherein a threaded hole intersects the bottom surface of the insert seat.

3. The turning tool according to claim 2, wherein the radial grooves intersect the hole formed in the turning insert.

4. The turning tool according to claim 1, wherein the bottom surface of the insert seat includes seat grooves, wherein the first ridge is formed between the seat grooves, and wherein the first ridge and the seat grooves are at least partially located on opposite sides in relation to a plane including the support surface.

5. The turning tool according to claim 1, wherein the center axis of the turning insert is perpendicular or generally perpendicular to the longitudinal axis of the turning tool.

6. The turning tool according to claim 1, wherein the first ridge and the radial grooves formed in the bottom surface of the turning insert have corresponding or generally corresponding shapes in cross sections.

7. The turning tool according to claim 1, wherein the number of ridges formed in the bottom surface of the insert seat is smaller than the number of radial grooves formed in the bottom surface of the turning insert.

8. The turning tool according to claim 1, wherein the first ridge includes ridge side surfaces connected by a ridge crest, wherein the ridge side surfaces are planar or generally planar, wherein the ridge side surfaces form an angle of 70-110° in relation to each other, wherein each radial groove includes radial groove side surfaces connected by a radial groove root, wherein the radial groove side surfaces form an angle of 70-110° in relation to each other.

9. The method to machine a metal work piece, comprising the steps of:
providing a metal work piece;
providing a turning tool according to claim 8;
rotating the metal work piece around a rotational axis thereof; and
cutting the metal work piece by moving the turning tool in a first direction parallel to the rotational axis of the metal work piece, wherein one ridge side surface is in contact with one radial groove side surface, and wherein a second ridge side surface is spaced apart from a second radial groove side surface.

10. The turning tool according to claim 1, wherein a cross section of each radial groove is uniform or substantially uniform, where a cross section of the first ridge is uniform or generally uniform.

11. The turning tool according to claim 1, wherein the turning tool includes exactly one insert seat.

12. The turning tool according to claim 1, wherein the rear surface of the insert seat includes two spaced apart rear contact surfaces, and wherein the rear contact surfaces are separated by a recess.

* * * * *